United States Patent
Yu et al.

(10) Patent No.: US 6,908,203 B2
(45) Date of Patent: Jun. 21, 2005

(54) BACKLIGHT MODULE OF LIQUID CRYSTAL DISPLAY

(75) Inventors: Hong-Tien Yu, Pate (TW); Cheng-Min Liao, Chung Li (TW)

(73) Assignee: Chunghwa Picture Tubes, Ltd., Taipei (TW)

(*) Notice: Subject to any disclaimer, the term of this patent is extended or adjusted under 35 U.S.C. 154(b) by 132 days.

(21) Appl. No.: 10/653,326

(22) Filed: Sep. 2, 2003

(65) Prior Publication Data

US 2004/0201976 A1 Oct. 14, 2004

(30) Foreign Application Priority Data

Apr. 10, 2003 (TW) .................................... 92205638 U

(51) Int. Cl.$^7$ ............................................. G01D 11/28
(52) U.S. Cl. ............................. 362/27; 362/31; 349/65
(58) Field of Search ............................. 362/26, 27, 31; 349/65

(56) References Cited

U.S. PATENT DOCUMENTS

| 6,464,367 | B2 | * | 10/2002 | Ito et al. ........................ 362/31 |
| 6,709,122 | B2 | * | 3/2004 | Adachi et al. ................ 362/27 |
| 2001/0017774 | A1 | * | 8/2001 | Ito et al. ........................ 362/31 |

* cited by examiner

Primary Examiner—Stephen F Husar
(74) Attorney, Agent, or Firm—Thomas, Kayden, Horstemeyer & Risley

(57) ABSTRACT

A backlight module is employed to provide a light source for LCD panel. The backlight module has a wedge-shaped distributor, three light pipes and two reflective arcs. The distributor is modified from rectangular-shaped to wedge-shaped so as to reduce its weight. Three light pipes are divided into two groups. One group having only one light pipe is positioned at first edge of the wedge-shaped distributor while the other group having two pipes is positioned at an edge opposite the first edge. The two groups of light pipes are rounded up respectively by two reflective arcs.

9 Claims, 2 Drawing Sheets

BACKLIGHT MODULE OF LIQUID CRYSTAL DISPLAY

BACKGROUND OF THE INVENTION

1. Field of Invention

The present invention relates to a back light module. More particularly, the present invention relates to a back light module of a liquid crystal display.

2. Description of Related Art

CRT display technology has been widely used for several decades. The advantages of CRT display are its excellent performance and low price due to mass production. However, the large size and high operation voltage thereof exclude CRT display from adapting to some applications.

In recent years, Flat Panel Display has been developed to achieve the same display performance as CRT display. An LCD (Liquid Crystal Display) panel is one type of Flat Panel Display technology that can be mass produced. The lightness and thinness thereof give LCD display a wide variety of uses, such as in PDAs (Personal Digital Assistants), notebook PCs, and other information appliances.

Because the liquid crystal can't emit light by itself, a backlight module is employed to provide a light source for the liquid crystal. In other words, the back light module provides brightness, light uniformity, and view angle. In mechanical features, the backlight module is also required to be thin, light, and shock resistant.

FIG. 1 illustrates a perspective view of backlight module for a conventional LCD. A rectangular backlight distributor 10 is equipped with four light pipes 15 at two sides. The four light pipes 15 are divided into two groups of two light pipes, respectively. This structure results in an LCD that is insufficiently thin and light.

SUMMARY OF THE INVENTION

It is therefore an objective of the present invention to provide a backlight module that reduces an LCD monitor's width and weight.

In accordance with the foregoing and other objectives of the present invention, a backlight module is employed to provide a light source for an LCD panel. The backlight module includes a wedge-shaped distributor, three light pipes and two reflective arcs. The shape of the distributor is modified from a rectangle to a wedge so as to reduce the weight thereof. Three light pipes are divided into two groups. One group having only one light pipe is positioned at first edge of the wedge-shaped distributor while the other group having two pipes is positioned at an edge opposite the first edge. The two groups of light pipes are rounded up respectively by two reflective arcs.

According to one preferred embodiment of preferred embodiment, the wedge-shaped distributor includes a plurality of reflective patterns. A reflector is positioned at a first side of the wedge-shaped distributor for reflecting light back to the distributor. A diffuser is positioned at a second side of the wedge-shaped distributor for diffusing light to the LCD panel, in which the second side is the opposite side of the first side.

In general, the changing the shape of the distributor to a wedge and the reduction in number of light pipes can minimize the weight of backlight module. Furthermore, extra space is left for installing a driver IC board because of the modifications thereto. The width of backlight module can thus be decreased.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
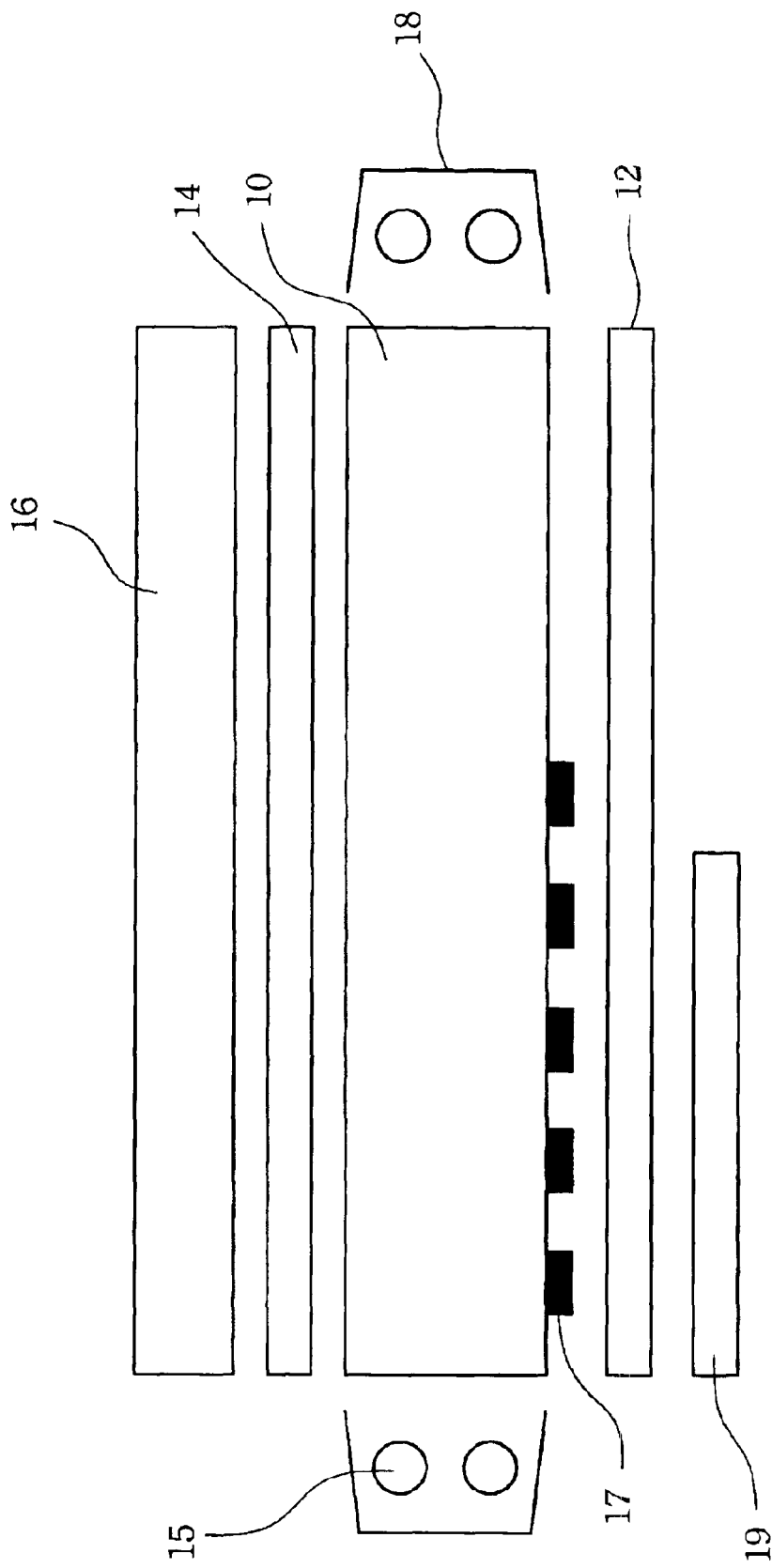
FIG. 1 illustrates a perspective view of a backlight module of a conventional LCD monitor.

Reference will now be made in detail to the present preferred embodiments of the invention, examples of which are illustrated in the accompanying drawings. Wherever possible, the same reference numbers are used in the drawings and the description to refer to the same or like parts.

In order to meet the demand for lightness and thinness of a backlight module, a wedge-shaped distributor is provided to minimize the weight of a distributor of the backlight module. Additionally, only three light pipes, instead of four, are employed as a light source. Extra space is left for installing a driver IC board without increasing thickness. Thus, the backlight module can achieve a goal of thinness and lightness.

Figure 2:
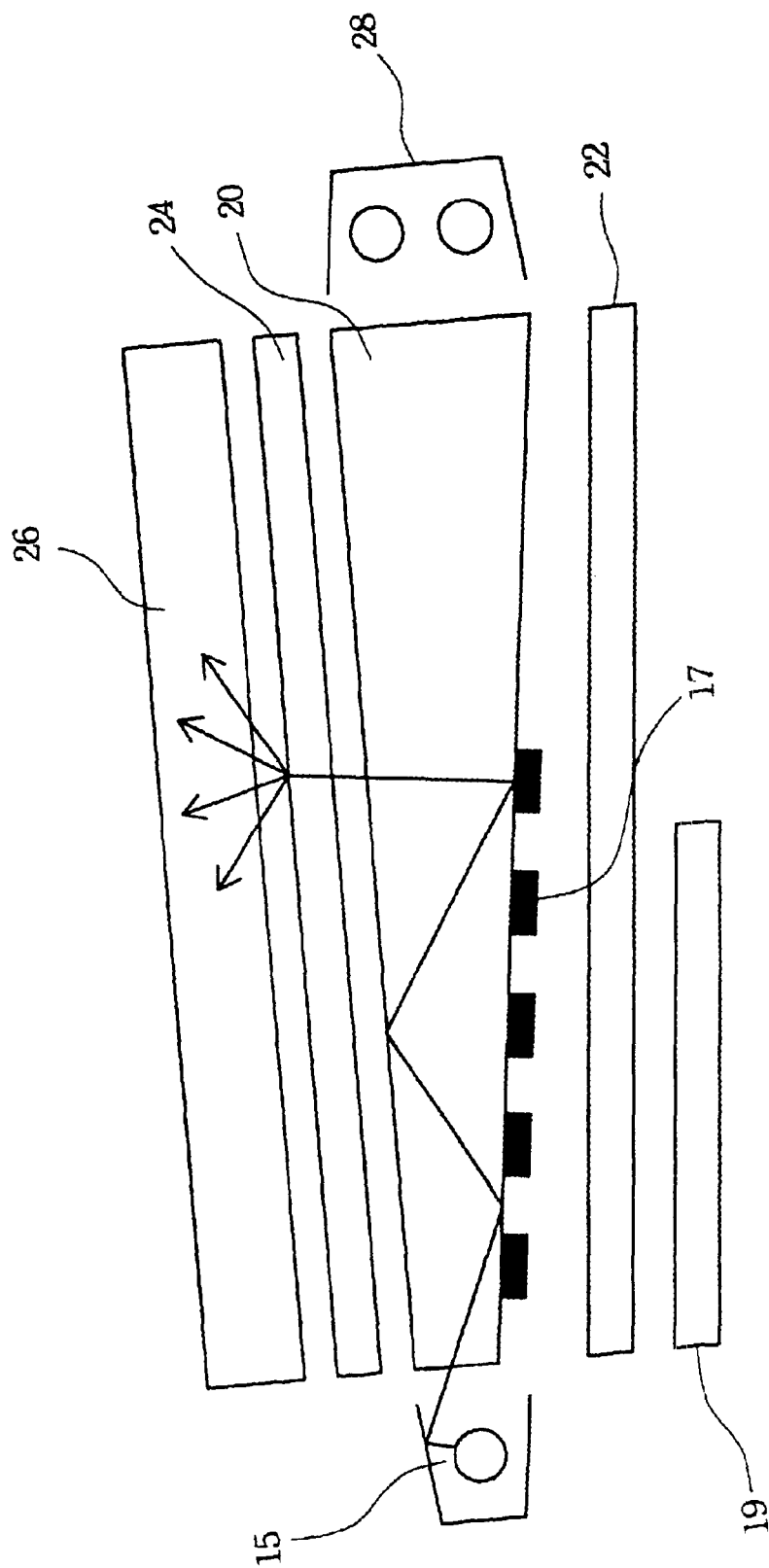
FIG. 2 illustrates a perspective view of a backlight module of an LCD monitor according to one preferred embodiment of this invention.

FIG. 2 illustrates a perspective view of a backlight module of an LCD monitor according to one preferred embodiment of this invention. The backlight module of preferred embodiment includes a distributor 20, light pipes 25, and reflective arcs 28. The backlight module is employed to provide a desired light source for an LCD panel 26.

The preferred embodiment of present invention illustrated in FIG. 2 is described as follows. This preferred embodiment uses one light pipe fewer than the conventional four light pipes in a backlight module. Thus, only one light pipe is located at one side of the distributor 20 while two light pipes are located at the other side of the distributor 20. Reflective arcs 28 lead light emitted from light pipes to a distributor. The distributor is modified to a wedge-shaped distributor 20 so as to decrease its weight. A diffuser 24 is installed between the wedge-shaped distributor 20 and the LCD panel 26. The diffuser 24 spreads light from the wedge-shaped distributor 20 uniformly over the LCD panel 26. In order to reserve maximum light source for the wedge-shaped distributor 20, a reflector 22 is installed adjacent to the wedge-shaped distributor 20. Part of light guided by reflective arcs 28 is reflected by reflective patterns 27 and is emitted toward the diffuser 24. The other part of light emitted from the wedge-shaped distributor 20 is reflected by the reflector 22 and is directed back to the wedge-shaped distributor 20 again. The light uniformity of the diffuser 24 depends on the distribution of reflective patterns 27. For example, reflective patterns 27 are arranged sparsely close to light pipes 25 while reflective patterns 27 are arranged densely far from reflective patterns 27. Therefore, light can be distributed uniformly over the LCD panel 26.

The wedge-shaped distributor 20 is made of a plastic material, such as, for example, Propylene Epoxy. The distributor 20 is thick and heavy such that the distributor 20 is modified from rectangular distributor to wedge-shaped distributor. In one preferred embodiment of present invention (illustrated in FIG. 2), one edge equipped with two light pipes has an equal width of the edge of conventional distributor (illustrated in FIG. 1). The other edge with one light pipe has a smaller width. Thus, total material of the distributor 20 can be reduced. Moreover, an extra space is left for installing a driver IC board because of the modifications to the distributor 20. The original width occupied by the driver IC board (illustrated in FIG. 1) is eliminated. The backlight module of present invention is thus thinner and lighter than the conventional one.

According to one preferred embodiment of present invention, the wedge-shaped distributor and light pipe deduction can minimize the weight of a backlight module. Furthermore, an extra space is left for installing a driver IC board because of the distributor's modification. The width of backlight module can be accordingly decreased.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A backlight module employed to provide a light source for a liquid crystal panel, said backlight module comprising:
   a wedge-shaped distributor;
   three light pipes, wherein the light pipes are divided into a first group comprising one light pipe and a second group comprising two light pipes, the first group being located at a first edge of said wedge-shaped distributor and the second group being located at a second edge opposite said first edge;
   two reflective arcs disposed respectively beside by said first group and said second group, wherein said two reflective arcs guide light from the light pipes to said wedge-shaped distributor.

2. The backlight module of claim 1, further comprising a reflector positioned at a first side of said wedge-shaped distributor for reflecting light back to said wedge-shaped distributor.

3. The backlight module of claim 2, wherein said wedge-shaped distributor comprises a plurality of reflective patterns.

4. The backlight module of claim 2, further comprising a diffuser positioned at a second side of said wedge-shaped distributor for diffusing light to said liquid crystal display panel, wherein said second side is an opposite side of said first side.

5. The backlight module of claim 2, further comprising a driver IC board positioned at said first side of said wedge-shaped distributor, an area of said driver IC board being smaller than that of said reflector, wherein said reflector is placed between said wedge-shaped distributor and said driver IC board.

6. A backlight module employed to provide light source for a liquid crystal panel, said backlight module comprising:
   a wedge-shaped distributor;
   three light pipes, one light pipe located at a first edge of said wedge-shaped distributor and two light pipes located at a second edge opposite said first edge;
   a reflector positioned at a first side of said wedge-shaped distributor;
   a driver IC board positioned at said first side of said wedge-shaped distributor, an area of said driver IC board being smaller than that of said reflector and said driver IC board being located close to said first edge; and
   two reflective arcs disposed respectively beside by said one light pipe and said two light pipes, wherein said two reflective arcs can guide light from the light pipes to said wedge-shaped distributor.

7. The backlight module of claim 6, further comprising a diffuser positioned at a second side of said wedge-shaped distributor for diffusing light to said liquid crystal display panel, wherein said second side is opposite said first side.

8. The backlight module of claim 6, wherein said reflector is placed between said wedge-shaped distributor and said driver IC board.

9. The backlight module of claim 6, wherein said wedge-shaped distributor comprises a plurality of reflective patterns.

* * * * *